April 8, 1930. G. A. SMITH 1,754,058
DENTAL PLATE AND THE METHOD OF CONSTRUCTING SAME
Filed March 19. 1927
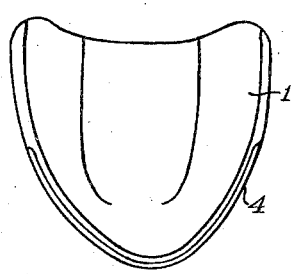
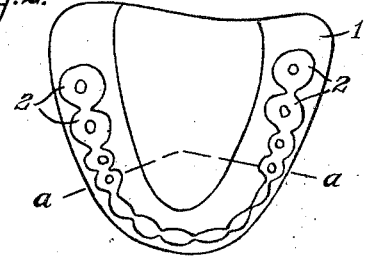
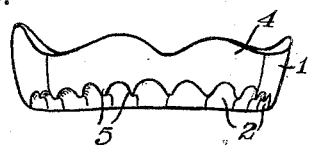
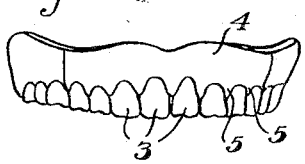
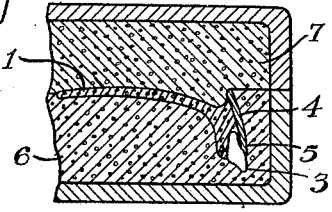
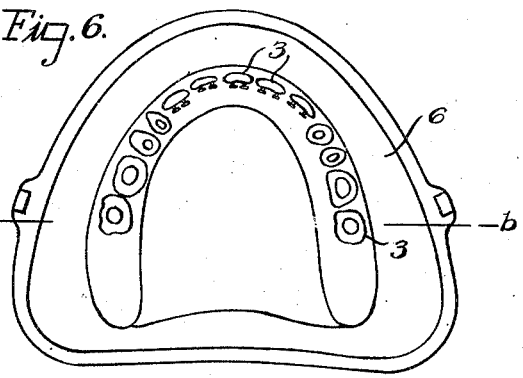
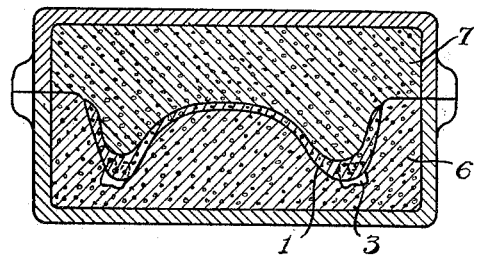
INVENTOR.
George A. Smith
BY Staley & Welch
ATTORNEYS.

Patented Apr. 8, 1930

1,754,058

UNITED STATES PATENT OFFICE.

GEORGE A. SMITH, OF SPRINGFIELD, OHIO

DENTAL PLATE AND THE METHOD OF CONSTRUCTING SAME

Application filed March 19, 1927. Serial No. 176,779.

This invention relates to dental plates and the method of constructing the same, it particularly relating to a method of the character referred to which permits the employment of a blank of rubber or other suitable material to form the plate instead of building up the plate piece by piece as is the usual practice.

In following the usual method of making a dental plate, the practice is to pack the rubber or other material which forms the plate piece by piece upon the mold and about the teeth which have been placed in the mold, which is a laborious job requiring considerable time. In constructing a plate in this manner, two colors of rubber are employed, a pink or gum colored rubber being employed for packing the forward sides of the upper portions or roots of the teeth, and a rubber of some other color, generally red, being employed to form the plate proper for the reason that pink rubber lacks the characteristic of imparting the necessary strength to the plate and is used only at the point necessary to give the proper gum color to that portion of the plate which is exposed in use. The combining of the pink rubber with the other rubber is an undertaking which requires considerable skill to prevent the red or other colored rubber from marring the appearance of the pink rubber on the exposed gum line. The usual method of packing the molds with two colors, i. e., pink to imitate the exposed gum and red to form the body of the plate, in a manner to keep the two colors from mixing and destroying the natural gum effect, is an art which is only acquired by long experience.

While some attempts have been made to provide a blank which can be placed on the mold for the purpose of forming a dental plate, yet all of said attempts have been crude and unsuccessful for the reason that they have not provided for the making of a composite plate formed of pink rubber for the gums and rubber of other color having other characteristics for the balance of the plate in a way which would permit such a blank to be used in a practical manner.

The object of my invention is to provide a method of forming dental plates from a blank so formed that the blank may be placed upon the mold and thereafter vulcanized without the necessity of any piece by piece packing so as to provide a dental plate which may be formed of rubber or other material having the proper strength and other characteristics and which will also have a part formed from pink or gum colored rubber so shaped and positioned on the blank as to register properly with the proximate spaces between the teeth and form the exposed part of the gum.

In the accompanying drawings:

Fig. 1 is a plan view of a blank employed in carrying out my invention, the blank shown in the present case being the one used for the upper plate and being a view of the upper side of the blank.

Fig. 2 is a view of the lower side of the blank shown in Fig. 1.

Fig. 3 is a front elevation of the blank.

Fig. 4 is a front elevation of the completed plate.

Fig. 5 is a section on the line a—a of Fig. 2.

Fig. 6 is a plan view of the lower half of the mold with the teeth in position ready to receive the blank.

Fig. 7 is a longitudinal section of a portion of the entire mold showing the portion of the blank in position therein before being vulcanized.

Fig. 8 is another section of the completed mold, the section being on the line b—b of Fig. 6.

Referring to the drawings, 1 represents a blank of soft unvulcanized rubber, or other suitable material, shaped to the approximate form of the dental plate which it is desired to construct. The blank 1 is formed of rubber similar to the rubber which dentists use in packing dental plates, which is generally a red rubber or black rubber, as such rubber has greater strength than the pink rubber used for the gum. It is my intention to make these blanks of several different sizes so that a size may be used which will approximate substantially the size of the plate to be formed. The lower edge of this blank is formed with a series of indentations or recesses 2 to receive the root portions of the teeth 3 and the rubber portion of the blank has an insert 4 of pink or gum colored rubber or other suitable material, this pink insert extending around the forward portion of the blank as far as it is usual to employ the pink or gum colored rubber. The lower edge of this insert is formed with a series of protuberances 5 positioned to fill the approximate spaces between the teeth.

After the mold has been completed and the teeth inserted in part 6 thereof as shown in Fig. 6, the blank is laid on the mold as shown in Figs. 7 and 8, with the roots of the teeth extending into the indentations or recesses 2 and the protuberances 5 of the pink insert projecting into the spaces between the teeth. The other half 7 of the mold is then placed in position and the two parts of the mold heated to some degree and clamped together thereby causing the soft rubber blank to conform to the contour of the mold cavity, the excess rubber escaping through the vents of the mold. The vulcanizing operation performed in the usual way.

The protuberances of the pink insert being of a yieldable character, readily adjust themselves between the spaces between the teeth so as to properly fill the spaces and the same is true of the walls of the indentations or recesses that receive the roots of the teeth.

By employing a blank of rubber constructed as described, a dentist of ordinary experience may make a plate without the danger of the two colors mingling to such an extent as to mar the natural gum effect, and the plate can be made from this blank with much less labor and care compared with the old method.

Having thus described my invention, I claim:

1. The method of forming a dental plate consisting of preforming a blank of plastic material with an insert of plastic material of different uniform character to form the gum line, pressing said blank and its insert upon a mold equipped with teeth, and thereafter hardening the blank and insert.

2. The method of forming a dental plate consisting in preforming a blank of plastic material with an insert of plastic material of a different character to form the gum line and having tooth receiving indentations, placing said blank and its insert upon a mold equipped with teeth, with the indentations registering with the teeth and thereafter hardening the blank and insert.

3. The method of forming a dental plate consisting in providing a preformed blank of plastic material with an insert of plastic material of different character, with the blank formed with indentations and the insert with protuberances, placing said blank and its insert upon a mold equipped with teeth with the indentations registering with the teeth and the protuberances registering with the spaces between the teeth, and thereafter hardening the blank and insert.

4. As an article of manufacture, a preformed blank for a dental plate consisting of a main portion of plastic material of uniform character throughout and another portion placed on the forward side of the main portion also of plastic material of a uniform character throughout but differing from the characteristics of the main portion of the blank.

In testimony whereof I have hereunto set my hand this 15th day of March, 1927.

GEORGE A. SMITH.